US012726327B2

(12) United States Patent
Singh et al.

(10) Patent No.: US 12,726,327 B2
(45) Date of Patent: Sep. 1, 2026

(54) SYSTEM AND METHOD FOR HANDLING NON-SYNCHRONOUS INTERRUPTS IN A TIME SYNCHRONOUS NETWORK

(71) Applicant: Infineon Technologies AG, Neubiberg (DE)

(72) Inventors: Ajinder Pal Singh, Allen, TX (US); Kameswara Medapalli, Saratoga, CA (US); Daniel Lee, Salt Lake City, UT (US)

(73) Assignee: Infineon Technologies AG, Neubiberg (DE)

( * ) Notice: Subject to any disclaimer, the term of this patent is extended or adjusted under 35 U.S.C. 154(b) by 129 days.

(21) Appl. No.: 18/586,699

(22) Filed: Feb. 26, 2024

(65) Prior Publication Data

US 2025/0274260 A1 Aug. 28, 2025

(51) Int. Cl.
*H04L 7/00* (2006.01)
*G06F 9/48* (2006.01)

(52) U.S. Cl.
CPC .......... *H04L 7/0016* (2013.01); *G06F 9/4837* (2013.01)

(58) Field of Classification Search
None
See application file for complete search history.

(56) References Cited

U.S. PATENT DOCUMENTS 5,539,911 A * 7/1996 Nguyen ................ G06F 9/3885 712/E9.055
5,784,377 A 7/1998 Baydar et al.
5,859,984 A 1/1999 Blair et al.
2002/0163932 A1 11/2002 Fischer et al.
2005/0237966 A1 10/2005 Aiello et al.
2015/0043917 A1* 2/2015 Simonneau ........ H04B 10/6161 398/79
2023/0062363 A1 3/2023 Golshan et al.
2024/0030982 A1* 1/2024 Cirik ...................... H04B 7/088

FOREIGN PATENT DOCUMENTS

CN 101379843 A 3/2009
WO 9703526 A1 1/1997

* cited by examiner

*Primary Examiner* — John A Follansbee
*Assistant Examiner* — Christopher P Cadorna
(74) *Attorney, Agent, or Firm* — Eschweiler & Potashnik, LLC

(57) ABSTRACT

Systems, methods, and circuitries are provided for handling non-synchronous interrupts in a time-synchronous network. In one example, a method for a primary device includes monitoring a communication channel during a series of configured packet time slots. Respective packet time slots in the series are mapped to respective secondary devices and successive packet time slots in the series are separated in time from one another by respective inter-packet time. The inter-packet times do not overlap any packet time slot. The method includes monitoring the communication channel during at least one common asynchronous interrupt time slot that occurs during a respective inter-packet time, and generating one or more control signals based on signals received during the packet time slots and the at least one common asynchronous interrupt time slot.

21 Claims, 4 Drawing Sheets

SYSTEM AND METHOD FOR HANDLING NON-SYNCHRONOUS INTERRUPTS IN A TIME SYNCHRONOUS NETWORK

FIELD

The present disclosure relates generally to the field of processors and control networks and in particular to synchronous control networks.

BACKGROUND

In some synchronous control networks, a primary device communicates with secondary devices during allocated time slots.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
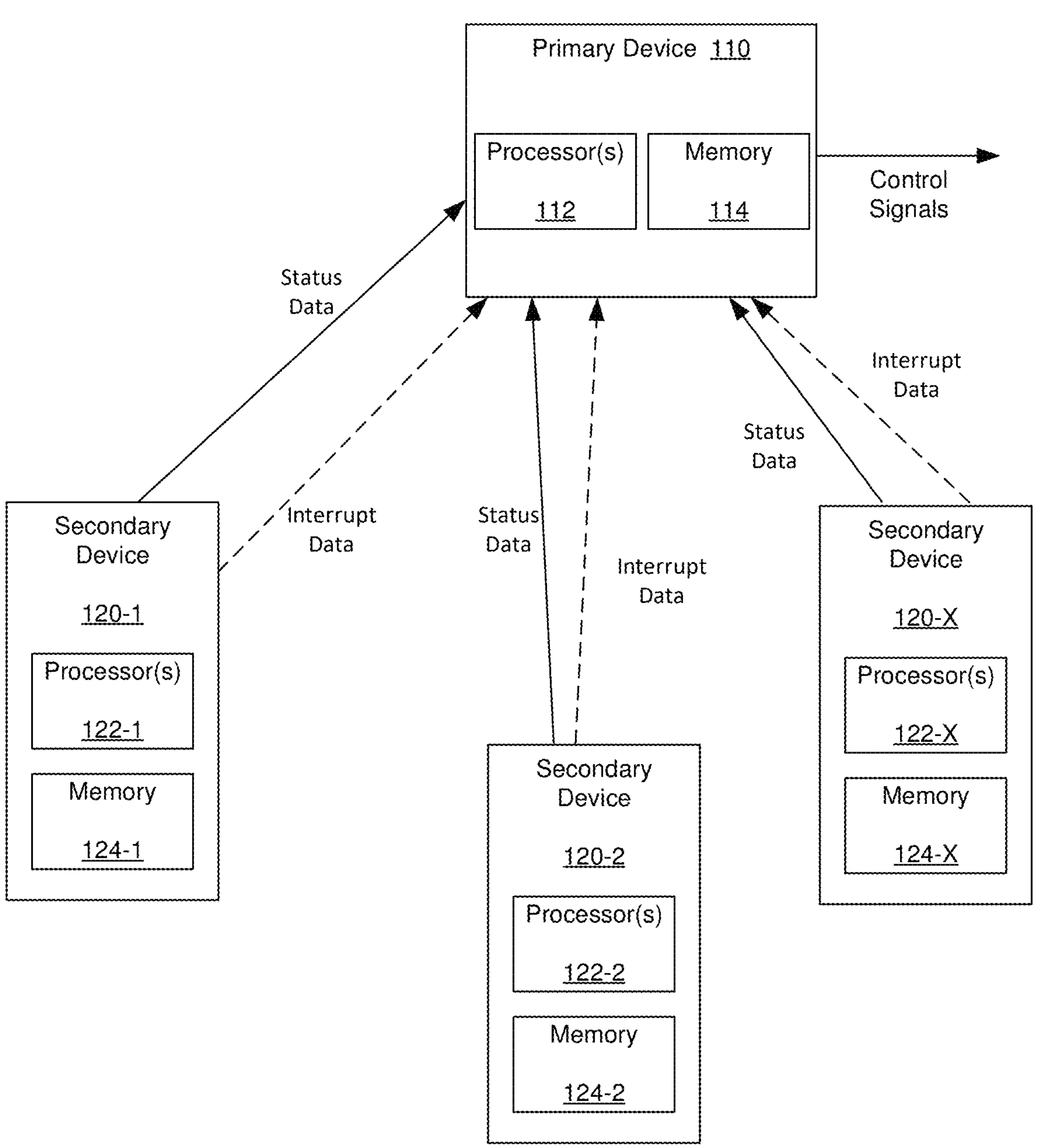
FIG. 1 is a block diagram of an exemplary synchronous network architecture in which secondary devices communicate status data and interrupt data to a primary device, in accordance with various aspects described.

The present disclosure is described with reference to the attached figures. Similar components in various figures may be represented by similar reference characters. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

As the number of sensors in automotive and industrial systems rapidly expands, different techniques may be considered for communicating sensor data in a low latency manner which can meet any safety-related fault-tolerant interval for a given application. This fault-tolerant interval is application specific and is an important specification that drives the rated safety level of a given communication network. It is preferred that the network setup time and communication between and primary device and a secondary device should be an order of magnitude shorter than the fault-tolerant interval. The latency of communication of sensor data becomes more important when the sensor data indicates a fault condition or is an alarm signal related to, for example, over-temperature or over-voltage situations. For example, a wireless battery management system may operate according to a short fault-tolerant interval to ensure that the batteries may be disconnected quickly after crash sensors detect a crash in order to avoid additional vehicle damage or injury.

Wireless communication of a vehicle's sensor data eliminates the need for wired connections between a primary controller and the sensors or sensor supervisor units. Vehicles may utilize existing wireless communication protocols such as Bluetooth or ultra wideband (UWB) which are well suited for wireless communication in compact networks to communicate sensor data. However, media access control (MAC) frameworks associated with existing wireless communication protocols, such as for example the IEEE 802.15.4 for UWB protocol or standards related to a connected car consortium (CCC) standard, may not support communication of fault-related sensor data that can meet the fault-tolerant interval for many automotive or industrial system applications, such as wireless-battery management applications for electric vehicles. While many of the examples disclosed herein are in the context of a wireless communication network it is to be understood that the solutions presented herein are equally applicable to wired networks.

FIG. 1 is a functional block diagram of a network that includes a primary device 110 and an arbitrary number X of secondary devices 120-1, 120-2, 120-X. The primary device 110 includes one or more processors (e.g., RF front end, IF, and/or baseband processors) 112 and memory 114. The one or more processors execute instructions stored in the memory 114 to perform operations as disclosed herein. The secondary devices 120 includes one or more processors (e.g., RF front end, IF, and/or baseband processors) 122 and memory 124. The one or more processors execute instructions stored in the memory 124 to perform operations as disclosed herein.

In a vehicle context, the primary device 110 may be a central controller that generates control signals for components of a given subsystem (e.g., steering, battery, powertrain, and so on) based on sensor data provided by the secondary devices. The secondary devices 120 may be individual sensors or supervisor units that gather raw sensor data from several sensors and package the data for communication to the primary device. The primary device 110 may generate control signals based on two types of sensor data, status data and interrupt data. Status data is data indicative of routine functioning of the monitored vehicle system. Status data may be periodically collected to confirm that the vehicle system is functioning normally, to track trends in sensor data for use in optimizing control signals or predicting maintenance needs, or other purposes related to routine operation of the vehicle system.

In contrast, interrupt data is data that indicates that the monitored system has entered a fault-related state in which the primary device should take immediate fault mitigation action such as shutting down components of the system or entering a safe mode of operation. The interrupt data here could be DIAGNOSTIC ALARMS such as over-voltage, Over-Current, Over-Temperature conditions and detecting such events with a fault-tolerant interval are critical to the safety of an application. Such on-time detection for wireless networks is critical as they may have a lot more built-in latency as compared to a wired-application. This proposal can also be extended to wired-applications.

By way of example, in the context of a wireless battery management system for an electric vehicle, the primary device 110 may be a battery control unit (BCU) and the secondary devices 120 may be cell supervisor units (CSUs) that each monitor sensors associated with a given set of battery cells (e.g., battery pack). The sensors may provide temperature and voltage data for individual cells or groups of cells. The secondary devices compile status data that indicates the temperature and voltage of the cells under their supervision and transmit the status data to the BCU. For example, the BCU can use the cell-voltage and cell-temperature data across cells to compute overall state of charge signals and state of health signals for a battery pack for transmission to the BCU.

The secondary devices 120 may be configured to generate interrupt data when the sensor data meets certain fault criteria such as, for example, an under voltage condition, an over voltage condition, or an over temperature condition. When the primary device receives interrupt data, it may generate a fault control signal or signals that respond to the interrupt data. For example, a BCU may generate a control signal that opens a connection between powertrain-related components and the battery cells associated with a CSU that transmitted the interrupt data. It can be seen that interrupt data is more time sensitive than status data and may be subject to industry standards for latency.

Figure 2:
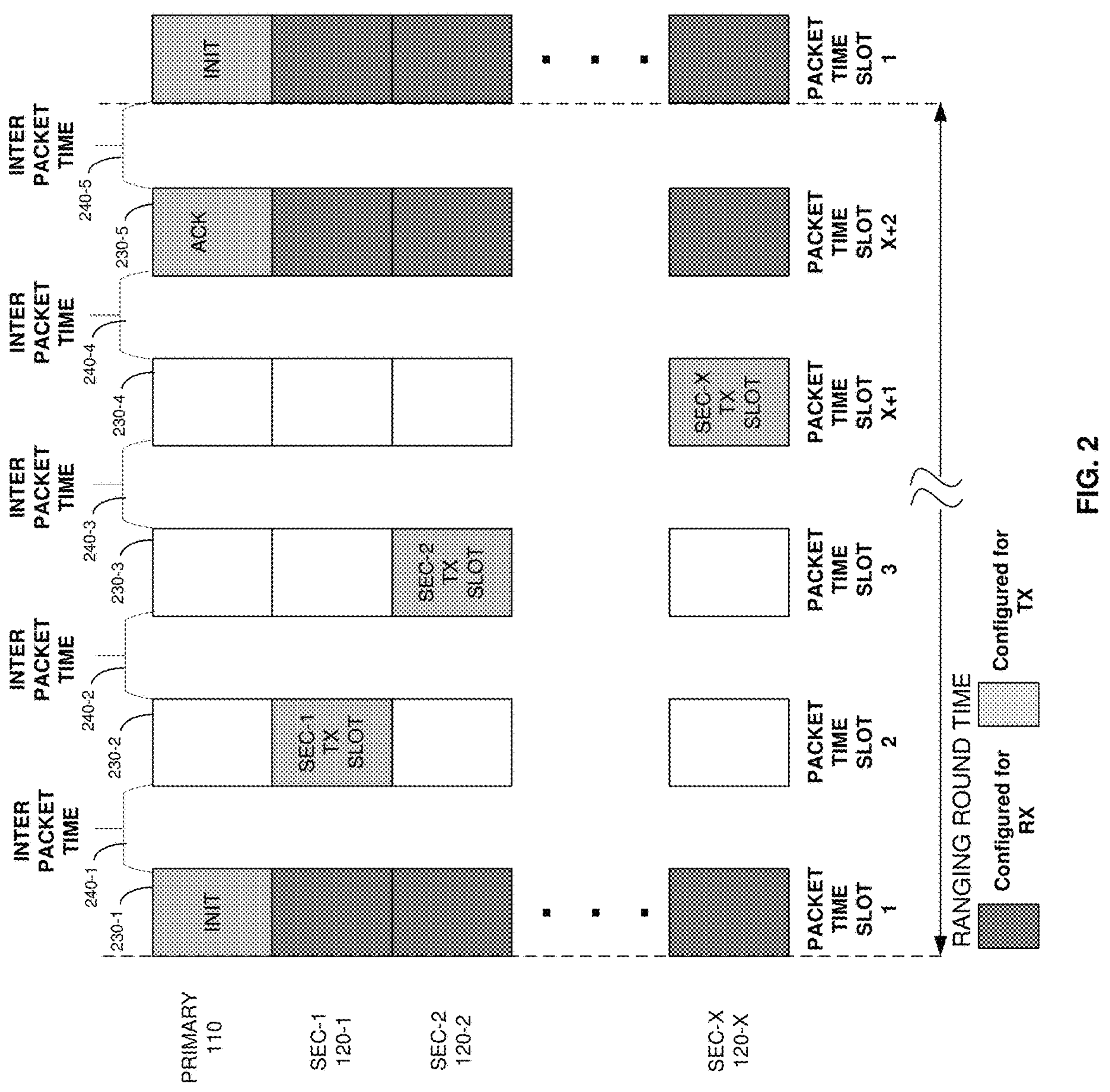
FIG. 2 is a timing diagram of the synchronous network of FIG. 1 that illustrates time slots allocated to communication of packets from the primary and secondary devices, in accordance with various aspects described.

FIG. 2 illustrates an example timing diagram for a UWB MAC framework. This framework may be used to configure synchronous UWB communication between a primary device and several secondary devices. In the framework, a communication frame of a set number of symbols or slots is divided into a series of successive packet time slots 230 each having a defined duration. In the illustrated example, the communication frame is divided into X+2 packet time slots. As indicated by the shading, each packet time slot is allocated for transmission of data by a single device, either the primary device or one of the secondary devices.

In each communication frame, the first packet time slot 230-1 may be allocated to the primary device for sending initialization data that may be used by the secondary devices to configure and/or synchronize communication and/or to trigger a ranging round of reporting packets from the secondary devices. The last packet time slot 230-5 may be allocated to the primary device for sending end of frame information such as acknowledgement information. Packet time slots between the first and last packet time slots are each mapped or allocated to one of the secondary devices for transmission of packets that encode sensor data or interrupt data. According to the protocol, secondary devices are configured to limit transmission to their respective configured packet time slots. For example, in packet time slot 230-1 the primary device 110 transmits synchronization information, in packet time slot 230-2 the secondary device 120-1 (and no other secondary device) transmits a packet of sensor data, and so on.

The UWB MAC framework defines or specifies inter packet time 240 between the packet time slots. Packets are not expected to be transmitted by either the primary device or the secondary devices during inter packet time. The inter packet time is provided to allow the devices to process any packet received in the immediately precedent packet time slot. The CCC3.0 standard sets the inter packet time 240 as equal in duration to a packet time slot. However, in other communication protocols, the configured inter packet time may not be equal in duration to a packet time slot and/or the configured packet time slots may not be equal in duration to one another.

A ranging round time, corresponding to the length of the communication frame, defines the maximum latency with which sensor data may be communicated to the primary device by a secondary device. The ranging round time is fixed based on the configured duration of the packet time slots, the number of packet time slots, and the configured inter packet time (i.e., as configured by the communication protocol). As the number of secondary devices increases, the ranging round time also increases proportionately.

The fault-tolerant interval for any safety-related application will define a latency tolerance with which certain interrupt data (e.g., fault related) may be communicated. This in turn limits the number of secondary devices that may be networked to a primary device while keeping the ranging round time below the latency requirement below the latency requirement derived from the fault-tolerant interval.

Described herein are systems, methods, devices, and circuitries that leverage configured inter packet time within a synchronous MAC framework to support handling of asynchronous interrupts in a low latency manner. While certain examples are disclosed for wireless communication networks, the techniques described herein may be equally suitable for wired or hybrid wired/wireless communication networks.

Figure 3:
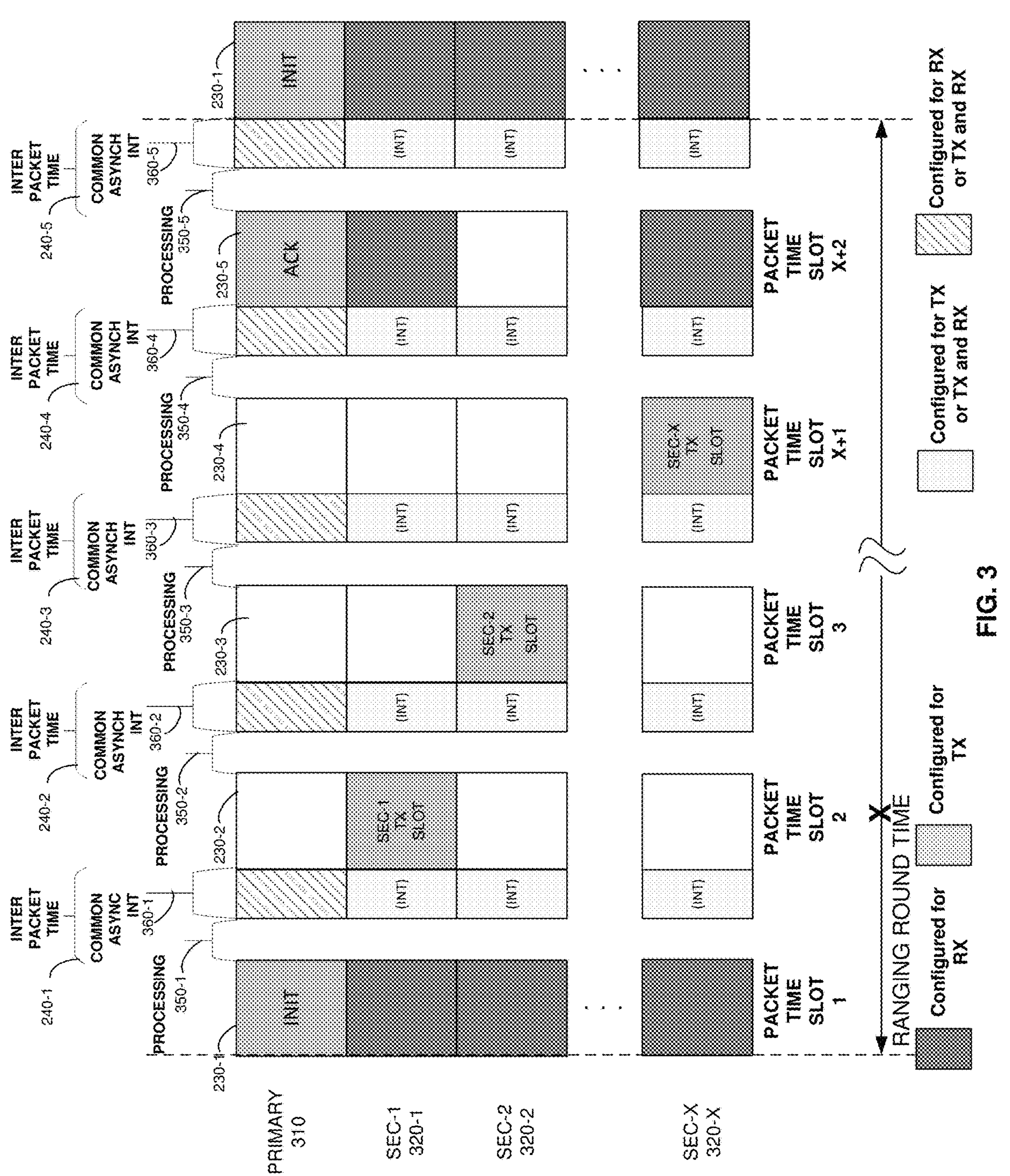
FIG. 3 is a timing diagram of the synchronous network of FIG. 1 that illustrates time slots allocated to communication of packets from the primary and secondary devices as well as a common asynchronous interrupt time slot between packet time slots, in accordance with various aspects described.

FIG. 3 is a timing diagram outlining an example modification of the MAC framework of FIG. 2 that allows for the communication of asynchronous interrupts during inter packet time. According to the modification, inter packet time 240 is divided into a first portion corresponding to processing time 350 and a second portion corresponding to common asynchronous interrupt time slot 360. The duration of the processing time 350 may be selected based on the time a slowest (in terms of packet processing) secondary device requires to process a packet.

Some MAC protocols may configure inter packet time duration to accommodate the processing of packets with largest expected payloads. However, when packets transmitted during packet time slots communicate a limited amount of information (e.g., sync information or a limited amount of sensor data), the devices in the network may be able to process a packet in significantly less time than the inter packet time configured by the MAC protocol. This means that there may be wasted inter packet time during which the devices are finished processing and waiting for the next packet time slot to occur. The proposed solutions leverage this extra inter-packet time as described below.

The remainder of the inter packet time 240 may be allocated as a common asynchronous interrupt time slot 360. In some examples, the duration of the interrupt time slot 360 is equal to the duration of the processing time 350. It may be beneficial to minimize the duration of the processing time 350 as much as possible while still ensuring proper packet processing to enlarge the duration of the common asynchronous interrupt time slot 360. In one example, the primary device 110 may configure the length of the common asynchronous time slot 360 based on the slowest processing capability amongst the secondary devices. The secondary devices may communicate their processing capability during an initialization process performed when secondary devices are set up to communicate with the primary controller. The configuration of the common asynchronous time slot duration may be communicated in each or selected ranging rounds by way of the initialization packet sent during packet time slot 230-1 or during the initialization process.

Secondary devices 320 may be configured to transmit interrupt data and the primary device 310 may be configured to receive interrupt data during all common asynchronous interrupt time slots 360. In some examples, only selected common asynchronous interrupt time slots (e.g., at least one per communication frame or every nth) are configured for communicating interrupt data. However, configuring every common asynchronous interrupt time slot for communicating interrupt data provides the lowest latency in communicating fault conditions.

The secondary devices 120 may be configured to transmit interrupt data during a common asynchronous interrupt time slot 360 occurring immediately subsequent to detection of a fault condition. For example, any secondary device 120 that detects a fault condition at the time labeled X in the ranging round time will transmit interrupt data during the common asynchronous interrupt time slot 360-2. If a secondary device is not capable, in terms of processing speed, of detecting a fault condition and transmitting the interrupt data in an immediately subsequent common asynchronous interrupt time slot, the secondary device may transmit the interrupt data in the first possible common asynchronous interrupt time slot (e.g., common asynchronous interrupt time slot 360-3 in the illustrated example).

Packets that carry interrupt data may be designed to have a small payload, such as a few flags, so that the interrupt data may be effectively communicated in the relatively short duration of the common asynchronous interrupt time slot.

It can be seen that the maximum latency with which interrupt data may be communicated has been reduced from the ranging round time to the duration of a single packet time slot and a single processing time. This greatly enhances the scalability of the MAC protocol and many more secondary devices may be handled by a single primary device.

Upon receiving interrupt data, the primary device may take remedial action such as transmitting a fault control signal. The fault control signal may be transmitted to a component other than a secondary device and/or on a different communication channel than the channel used for communication of status data and interrupt data.

If interrupt data from a single secondary device has been received in the common asynchronous interrupt time slot, the primary device may be able to generate a control signal specific to the components monitored by the secondary device identified in the interrupt data. When the interrupt data includes information about the nature of a fault condition (e.g., over temperature or over voltage), the primary device may generate a control signal specific to the fault condition.

If multiple packets of interrupt data collide during a common asynchronous interrupt time slot, the primary device may generate control signals for all components under the control of any of the secondary devices. In other examples, if the primary device receives any signal during a common asynchronous interrupt time slot, the primary device will generate a generic fault mitigation control signal.

In some examples, the fault control signal is a broadcast interrupt signal. The broadcast interrupt signal may be transmitted on a different communication channel or on the same communication channel used to receive the interrupt data. When the same communication channel is used, the broadcast interrupt signal may be transmitted during a common asynchronous interrupt time slot. In this case, the primary and secondary devices are configured to transmit and receive during the common asynchronous interrupt time slots 360. In some examples, the interrupt data sent by the secondary device is a broadcast interrupt signal that is received by the primary device and the secondary devices. The interrupt signal, when received by a secondary device, causes the secondary device to enter a fault mode (e.g., shut down or other safe mode of operation).

Figure 4:
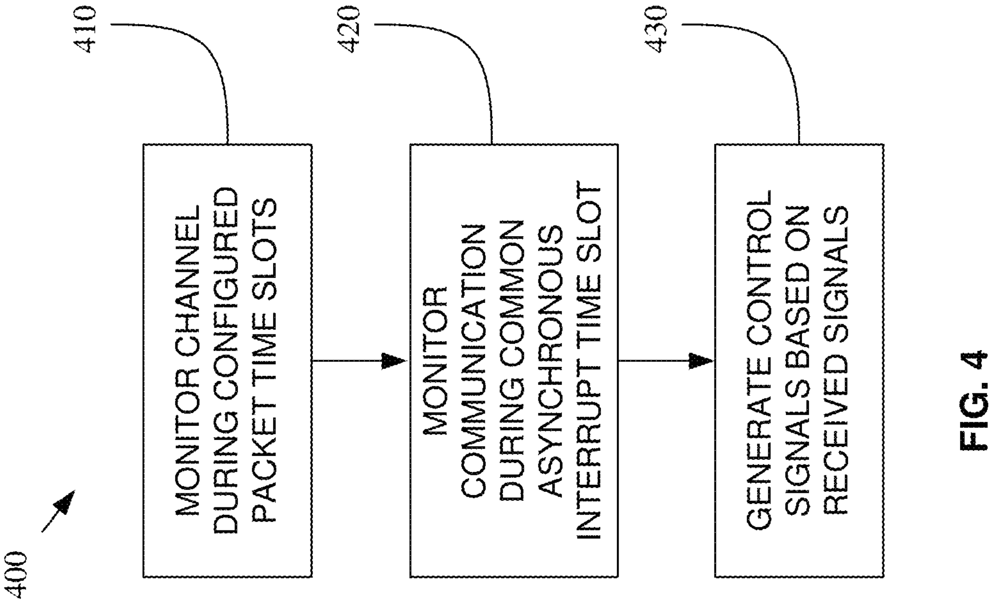
FIG. 4 is a flow diagram outlining an exemplary method of processing asynchronous interrupts, in accordance with various aspects described.

FIG. 4 is a flow diagram outlining an example method 400 for processing asynchronous interrupts in a synchronous network. The method may be performed, for example by a primary device 110 of FIG. 1 and 310 of FIG. 3. The method includes, at 410, monitoring a communication channel during a series of configured packet time slots. Respective packet time slots in the series are mapped to respective secondary devices, and successive packet time slots in the series are separated in time from one another by respective inter-packet time. The inter-packet times do not overlap any packet time slot. See FIG. 2 or 3 for an example of configured packet time slots 230 and inter-packet times 240.

At 420, the communication channel is monitored during at least one common asynchronous interrupt time slot that occurs during a respective inter-packet time. See FIG. 3 for example of common asynchronous interrupt time slots 360. The method may include monitoring common asynchronous interrupt time slots occurring in selected inter packet times or in each and every respective inter-packet time of the series of configured packet time slots.

The portion of the inter-packet time used as the common asynchronous interrupt time slot may correspond to a second portion of the inter-packet time that occurs after a first portion of the inter-packet time that is used to process packets received during packet time slots. The duration of the first portion and the second portion may be configurable.

The method may include monitoring the communication channel for interrupt information from any of the secondary devices status during the at least one common asynchronous interrupt time slot. The interrupt information may include an interrupt flag.

At 430, the method includes generating one or more control signals based on signals received during the packet time slots and the at least one common asynchronous interrupt time slot. For example, the method may include generating a fault control signal in response to receiving a signal during any common asynchronous interrupt time slot. In some examples, the fault control signal is a broadcast interrupt signal that, when received by a secondary device, causes the secondary device to enter a fault mode. The broadcast interrupt signal may be transmitted during the common asynchronous interrupt time slot.

Figure 5:
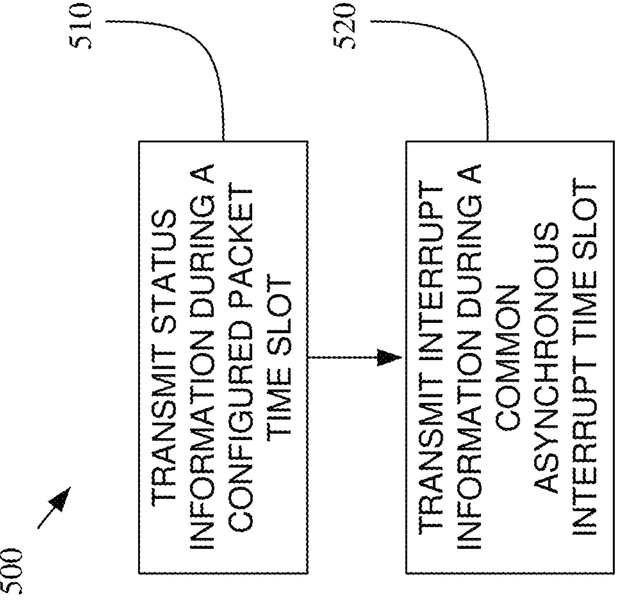
FIG. 5 is a flow diagram outlining an exemplary method of transmitting asynchronous interrupts, in accordance with various aspects described.

FIG. 5 is a flow diagram outlining an example method 500 for transmitting asynchronous interrupts in a synchronous network. The method may be performed, for example by a secondary device 120 of FIG. 1 and 320 of FIG. 3. The method includes, at 510, using a communication channel, transmitting status information to a primary device during a configured packet time slot. The configured packet time slot is one of a series of respective packet time slots allocated for respective secondary devices in a set of secondary devices. The packet time slots in the series are separated in time from one another by inter-packet time. See FIG. 2 or 3 for an example of configured packet time slots 230 and inter-packet times 240.

At 520, the method includes, using the communication channel, transmitting interrupt information during a common asynchronous interrupt time slot that corresponds to at least a portion of an inter-packet time. See FIG. 3 for example of common asynchronous interrupt time slots 360.

The portion of the inter-packet time used as the common asynchronous interrupt time slot may correspond to a second portion of the inter-packet time that occurs after a first portion of the inter-packet time that is used to process packets received during packet time slots. The duration of the first portion and the second portion may be configured based on, for example, a configuration received from a primary device.

In some examples, the interrupt information is transmitted to the primary device. In this case, the interrupt information may be a packet that includes an interrupt flag. In some examples, the interrupt information includes a broadcast interrupt signal that, when received by another secondary device, causes the other secondary device to enter a fault mode.

The method may include monitoring the communication channel during the common asynchronous interrupt time slot for a broadcast interrupt signal transmitted by a primary device or another secondary device.

While some of the examples herein are in the context of a vehicle subsystem, such as a battery management system, it is to be understood that the disclosed techniques may be applied in any context, such as IOT, where a MAC protocol configures a synchronous polling technique in which a primary device receives data from many secondary devices during assigned packet time slots that are separated by configured inter packet time.

Example 1 is a primary device, including a memory and a processor, wherein the processor is configured to, when executing instructions stored in the memory, cause the primary device to monitor a communication channel during a series of configured packet time slots, wherein respective packet time slots in the series are mapped to respective secondary devices, wherein successive packet time slots in the series are separated in time from one another by respective inter-packet time, further wherein the inter-packet times do not overlap any packet time slot; monitor the communication channel during at least one common asynchronous interrupt time slot that occurs during a respective inter-packet time; and generate one or more control signals based on signals received during the packet time slots and the at least one common asynchronous interrupt time slot.

Example 2 includes the subject matter of example 1, including or omitting optional elements, wherein the processor is configured to, when executing instructions stored in the memory, cause the primary device to monitor the communication channel during respective common asynchronous interrupt time slots occurring in all respective inter-packet times of the series of configured packet time slots.

Example 3 includes the subject matter of example 1, including or omitting optional elements, wherein the at least a portion of the inter-packet time corresponds to a second portion of the inter-packet time that occurs after a first portion of the inter-packet time.

Example 4 includes the subject matter of example 3, including or omitting optional elements, wherein the processor is configured to, when executing instructions stored in the memory, cause the primary device to configure a duration of the first portion of the inter-packet time and a duration of the second portion of the inter-packet time.

Example 5 includes the subject matter of example 1, including or omitting optional elements, wherein the processor is configured to, when executing instructions stored in the memory, cause the primary device to during each respective packet time slot, monitor the communication channel for status information from the secondary device mapped to the packet time slot; and during the at least one common asynchronous interrupt time slot, monitor the communication channel for interrupt information from any of the secondary devices.

Example 6 includes the subject matter of example 5, including or omitting optional elements, wherein the interrupt information includes an interrupt flag.

Example 7 includes the subject matter of example 1, including or omitting optional elements, wherein the processor is configured to, when executing instructions stored in the memory, cause the primary device to generate a fault control signal in response to receiving a signal during any common asynchronous interrupt time slot.

Example 8 includes the subject matter of example 7, including or omitting optional elements, wherein the fault control signal is a broadcast interrupt signal that, when received by a secondary device, causes the secondary device to enter a fault mode.

Example 9 includes the subject matter of example 8, including or omitting optional elements, wherein the broadcast interrupt signal is transmitted during the common asynchronous interrupt time slot.

Example 10 is a secondary device, including a memory and a processor, wherein the processor is configured to, when executing instructions stored in the memory, cause the secondary device to using a communication channel, transmit status information to a primary device during a configured packet time slot, wherein the configured packet time slot is one of a series of respective packet time slots allocated for respective secondary devices in a set of secondary devices, wherein the respective packet time slots in the series are separated in time from one another by respective inter-packet time; and using the communication channel, transmit interrupt information during a common asynchronous interrupt time slot that corresponds to at least a portion of an inter-packet time.

Example 11 includes the subject matter of example 10, including or omitting optional elements, wherein the at least a portion of the inter-packet time corresponds to a second portion of the inter-packet time that occurs after a first portion of the inter-packet time.

Example 12 includes the subject matter of example 10, including or omitting optional elements, wherein the processor is configured to, when executing instructions stored in the memory, cause the secondary device to configure a duration of a first portion of the inter-packet time and a duration of a second portion of the inter-packet time based on a configuration received from the primary device.

Example 13 includes the subject matter of example 10, including or omitting optional elements, wherein the interrupt information includes a packet that includes an interrupt flag.

Example 14 includes the subject matter of example 10, including or omitting optional elements, wherein the processor is configured to, when executing instructions stored in the memory, cause the secondary device to monitor the communication channel during the common asynchronous interrupt time slot for a broadcast interrupt signal.

Example 15 includes the subject matter of example 10, including or omitting optional elements, wherein the interrupt information includes a broadcast interrupt signal that, when received by another secondary device, causes the other secondary device to enter a fault mode.

Example 16 is a method, including monitoring a communication channel during a series of configured packet time slots, wherein respective packet time slots in the series are mapped to respective secondary devices, wherein successive packet time slots in the series are separated in time from one another by respective inter-packet time, further wherein the inter-packet times do not overlap any packet time slot; monitoring the communication channel during at least one common asynchronous interrupt time slot that occurs during a respective inter-packet time; and generating one or more control signals based on signals received during the packet time slots and the at least one common asynchronous interrupt time slot.

Example 17 includes the subject matter of example 16, including or omitting optional elements, including configuring a duration of a first portion of the inter-packet time and a duration of a second portion of the inter-packet time.

Example 18 includes the subject matter of example 16, including or omitting optional elements, including during each respective packet time slot, monitoring the communication channel for status information from the secondary device mapped to the packet time slot; and during the at least one common asynchronous interrupt time slot, monitoring the communication channel for interrupt information from any of the secondary devices.

Example 19 includes the subject matter of example 16, including or omitting optional elements, including generating a fault control signal in response to receiving a signal during any common asynchronous interrupt time slot.

Example 20 includes the subject matter of example 19, including or omitting optional elements, wherein the fault control signal is a broadcast interrupt signal that, when received by a secondary device, causes the secondary device to enter a fault mode.

Example 21 includes the subject matter of example 20, including or omitting optional elements, including transmitting the fault control signal during the common asynchronous interrupt time slot.

Example 21 is a method that includes the functions or operations performed by any of claims 10-15.

Example 22 is an apparatus that includes the memory and processor of any of claims 1-15.

Example 23 is an apparatus that includes means for performing the operations or functions performed by the processor of any of claims 1-15.

In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term encode when used with reference to some entity or value of an entity is to be construed broadly as encompassing any manner or technique for generating a data sequence or signal that communicates the entity to another component.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. The term derive should be construed to encompass computing or calculating the entity or value of the entity based on other quantities or entities. The term derive should be construed to encompass any manner of deducing or identifying an entity or value of the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

Although specific embodiments/examples/aspects have been illustrated and described herein, it will be appreciated by those of ordinary skill in the art that a variety of alternate and/or equivalent implementations may be substituted for the specific examples shown and described without departing from the scope of the present invention. This application is intended to cover any adaptations or variations of the specific examples discussed herein. Therefore, it is intended that this invention be limited only by the claims and the equivalents thereof.

It should be noted that the examples as outlined in the present document may be used stand-alone or in combination with the other methods and systems disclosed in this document. In addition, the features outlined in the context of an apparatus are also applicable to a corresponding method, and vice versa. Furthermore, all aspects of the methods and apparatus outlined in the present document may be arbitrarily combined. In particular, the features of the claims may be combined with one another in an arbitrary manner.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A primary device, comprising a memory and a processor, wherein the processor is configured to, when executing instructions stored in the memory, cause the primary device to configure a plurality of secondary devices based on a series of packet time slots, wherein respective packet time slots in the series are mapped to respective secondary devices, wherein successive packet time slots in the series are separated in time from one another by inter-packet times, further wherein the inter-packet times do not overlap any packet time slot;

further configure at least one of the plurality of secondary devices based on a common asynchronous interrupt time slot that occurs during an inter-packet time, wherein the configuring based on the common asynchronous interrupt time slot causes the secondary device to transmit an interrupt signal during the common asynchronous interrupt time slot;

during respective packet time slots, receive status information from a secondary device mapped to the packet time slot;

during the common asynchronous interrupt time slot, monitor for an interrupt signal from the at least one of the plurality of secondary devices; and generate one or more control signals based on signals received during the packet time slots and the common asynchronous interrupt time slot.

2. The primary device of claim 1, wherein the processor is configured to, when executing instructions stored in the memory, cause the primary device to configure respective common asynchronous interrupt time slots in all inter-packet times of the series of configured packet time slots.

3. The primary device of claim 1, wherein the at least a portion of the inter-packet time corresponds to a second portion of the inter-packet time that occurs after a first portion of the inter-packet time.

4. The primary device of claim 3, wherein the processor is configured to, when executing instructions stored in the memory, cause the primary device to configure a duration of the first portion of the inter-packet time or a duration of the second portion of the inter-packet time, wherein the duration of the second portion comprises the duration of the common asynchronous interrupt time slot.

5. The primary device of claim 1, wherein the processor is configured to, when executing instructions stored in the memory, cause the primary device to configure more than one of the secondary devices to transmit an interrupt signal during the common asynchronous interrupt time slot.

6. The primary device of claim 5, wherein the interrupt signal comprises an interrupt flag.

7. The primary device of claim 1, wherein the processor is configured to, when executing instructions stored in the memory, cause the primary device to generate a fault control signal in response to receiving an interrupt signal during any common asynchronous interrupt time slot.

8. The primary device of claim 7, wherein the fault control signal is a broadcast interrupt signal that, when received by a secondary device, causes the secondary device to enter a fault mode.

9. The primary device of claim 1, wherein the processor is configured to, when executing instructions stored in the memory, cause the primary device to configure the plurality of secondary devices to monitor for a broadcast interrupt signal during the common asynchronous interrupt time slot.

10. A method, comprising configuring a plurality of secondary devices based on a series of packet time slots, wherein respective packet time slots in the series are mapped to respective secondary devices, wherein successive packet time slots in the series are separated in time from one another by inter-packet times, further wherein the inter-packet times do not overlap any packet time slot;

further configuring at least one of the plurality of secondary devices based on a common asynchronous interrupt time slot that occurs during an inter-packet time, wherein the configuring based on the common asynchronous interrupt time slot causes the secondary device to transmit an interrupt signal during the common asynchronous interrupt time slot;

during respective packet time slots, receiving status information from a secondary device mapped to the packet time slot;

during the common asynchronous interrupt time slot, monitoring for an interrupt signal from the at least one of the plurality of secondary devices; and generating one or more control signals based on signals received during the packet time slots and the common asynchronous interrupt time slot.

11. The method of claim 10, comprising configuring a duration of a first portion of the inter-packet time or a duration of a second portion of the inter-packet time.

12. The method of claim 10, comprising configuring more than one of the secondary devices to transmit an interrupt signal during the common asynchronous interrupt time slot.

13. The method of claim 10, comprising generating a fault control signal in response to receiving an interrupt signal during any common asynchronous interrupt time slot.

14. The method of claim 13, wherein the fault control signal is a broadcast interrupt signal that, when received by a secondary device, causes the secondary device to enter a fault mode.

15. The method of claim 14, comprising configuring the plurality of secondary devices to monitor for the fault control signal during the common asynchronous interrupt time slot.

16. A processor configured to, when executing instructions stored in a memory, cause a primary device to configure a plurality of secondary devices based on a series of packet time slots, wherein respective packet time slots in the series are mapped to respective secondary devices, wherein successive packet time slots in the series are separated in time from one another by inter-packet times, further wherein the inter-packet times do not overlap any packet time slot;

further configure at least one of the plurality of secondary devices based on a common asynchronous interrupt time slot that occurs during an inter-packet time, wherein the configuring based on the common asynchronous interrupt time slot causes the secondary device to transmit an interrupt signal during the common asynchronous interrupt time slot; and generate one or more control signals based on signals received during the packet time slots and the common asynchronous interrupt time slot.

17. The processor of claim 16, wherein the processor is configured to cause the primary device to configure a duration of a first portion of the inter-packet time or a duration of a second portion of the inter-packet time that follows the first portion of the inter-packet time, wherein the duration of the second portion comprises the duration of the common asynchronous interrupt time slot.

18. The processor of claim 16, wherein the processor is configured to cause the primary device to configure more than one of the secondary devices to transmit an interrupt signal during the common asynchronous interrupt time slot.

19. The processor of claim 16, wherein the processor is configured to cause the primary device to generate a fault control signal in response to receiving an interrupt signal during any common asynchronous interrupt time slot.

20. The processor of claim 19, wherein the fault control signal is a broadcast interrupt signal that, when received by a secondary device, causes the secondary device to enter a fault mode.

21. The processor of claim 16, wherein the processor is configured to cause the primary device to configure the plurality of secondary devices to monitor for a broadcast interrupt signal during the common asynchronous interrupt time slot.

* * * * *